(12) United States Patent
Bruck et al.

(10) Patent No.: US 9,782,859 B2
(45) Date of Patent: Oct. 10, 2017

(54) SLAG FREE FLUX FOR ADDITIVE MANUFACTURING

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 163 days.

(21) Appl. No.: 14/800,784

(22) Filed: Jul. 16, 2015

(65) Prior Publication Data

US 2017/0014956 A1    Jan. 19, 2017

(51) Int. Cl.
| | |
|---|---|
| *B23K 35/34* | (2006.01) |
| *B23K 35/365* | (2006.01) |
| *B23K 35/36* | (2006.01) |
| *B23K 26/00* | (2014.01) |
| *B23K 35/02* | (2006.01) |

(52) U.S. Cl.
CPC ............ *B23K 35/365* (2013.01); *B23K 26/00* (2013.01); *B23K 35/0255* (2013.01); *B23K 35/361* (2013.01); *B23K 35/3602* (2013.01); *B23K 35/3603* (2013.01); *B23K 35/3605* (2013.01); *B23K 35/3607* (2013.01); *B23K 35/3608* (2013.01)

(58) Field of Classification Search
CPC .. B23K 35/34; B23K 26/3206; B23K 25/005; B23K 35/362; B23K 35/0233
See application file for complete search history.

(56) References Cited

U.S. PATENT DOCUMENTS

| | | | |
|---|---|---|---|
| 3,519,789 A | 7/1970 | Nelson | |
| 3,531,620 A | 9/1970 | Arikawa et al. | |
| 4,145,598 A | 3/1979 | Iio et al. | |
| 6,124,569 A | 9/2000 | Bonnet et al. | |
| 2006/0165552 A1* | 7/2006 | Kapoor | B23K 35/0261 420/70 |
| 2010/0116793 A1* | 5/2010 | Gruger | B23K 9/04 219/121.14 |
| 2012/0181255 A1 | 7/2012 | Bruck | |
| 2013/0140278 A1* | 6/2013 | Bruck | B23K 25/005 219/73.11 |
| 2015/0027993 A1* | 1/2015 | Bruck | B23K 26/32 219/73.2 |

(Continued)

FOREIGN PATENT DOCUMENTS

EP    1731258 A1    12/2006

OTHER PUBLICATIONS

PCT International Search Report and Written Opinion dated Nov. 8, 2016 corresponding to PCT Application No. PCT/US2016/041097 filed Jul. 6, 2016 (10 pages).

*Primary Examiner* — Veronica F Faison

(57) ABSTRACT

A flux (55) for superalloy laser welding and additive processing (20, 50), including constituents which decompose when heated in a laser induced plasma or to a melt temperature of the superalloy (42), creating one or more gases (46) that blanket the melt to protect it from air, while producing not more than 5 wt. % of slag relative to the weight of the flux. Embodiments may further include compounds providing one or more functions of surface cleaning, scavenging of impurities in the melt, and elemental additions to the superalloy.

20 Claims, 1 Drawing Sheet

(56) References Cited

U.S. PATENT DOCUMENTS

2015/0027994 A1* 1/2015 Bruck .................... B23K 26/60
219/73.21
2015/0102016 A1 4/2015 Bruck et al.

* cited by examiner

SLAG FREE FLUX FOR ADDITIVE MANUFACTURING

FIELD OF THE INVENTION

The invention relates to additive manufacturing and repair of metal components, and particularly to a flux that generates gaseous protection from the atmosphere while avoiding the formation of slag during the deposition of superalloy material.

BACKGROUND OF THE INVENTION

Additive manufacturing and repair typically involves:
1. Spreading a layer of metal filler powder over a working surface;
2. Traversing an energy beam over the powder to melt it, creating a new working surface; and
3. Repeating from step 1 until the component is built or restored.

This process is often conducted under a blanket of an inert gas such as argon to protect the melt pool from oxidation and to protect the powder from hydration. Flux may be added to the metal powder to cleanse the melt of contaminants, thereby forming slag that solidifies on top of the deposited material, thereby continuing to provide protection from oxidation if the blanket of inert gas dissipates before the deposited material is sufficiently cooled. However, slag can interfere with the energy beam, and the solidified slag must be removed between layering steps, so additive manufacturing and repair is inconvenienced and slowed by slag formation.

Superalloy materials are difficult to fabricate and repair due to their high melting points and susceptibility to weld solidification cracking and strain age cracking. They can have melting point ranges of 1200 to 1400° C. and higher, and are used for components in the hot gas path in gas turbine engines. A superalloy is a highly corrosion and oxidation resistant alloy with excellent mechanical strength and resistance to creep at high temperatures. A superalloy usually includes combinations of Ni, Co, Cr, and sometimes Fe, plus lesser amounts of W, Mo, Ta, Nb, Ti, and Al. Nickel-based superalloys contain more nickel than any other constituent—usually at least 40 wt. % Ni—and may contain little or no Fe or Co. Examples of superalloys include alloys sold under the trademarks and brand names Hastelloy, Inconel alloys (e.g. IN 738, IN 792, IN 939), Rene alloys (e.g. Rene N5, Rene 41, Rene 80, Rene 108, Rene 142, Rene 220), Haynes alloys (282), Mar M, CM 247, CM 247 LC, C263, 718, X-750, ECY 768, 282, X45, PWA 1480, PWA 1483, PWA 1484, CMSX single crystal alloys (e.g., CMSX-4, CMSX-8, CMSX-10), GTD 111, GTD 222, MGA 1400, MGA 2400, PSM 116, IN 713C, Mar-M-200, IN 100, IN 700, Udimet 600, Udimet 500 and titanium aluminide.

BRIEF DESCRIPTION OF THE DRAWINGS

The invention is explained in the following description in view of the drawings that show.

DETAILED DESCRIPTION OF THE INVENTION

The inventors have formulated fluxes that generate gaseous protection from the atmosphere while avoiding the formation of slag. The flux may be mixed with metal filler powder or spread on top of the metal power with mixing occurring in the melt pool. The flux has one or more constituents which, when heated close to a liquid temperature of the metal powder, produce one or more gasses, typically heavier than air, that produce a blanket on the deposit. Not more than 5 wt % of the flux becomes slag. The remainder either becomes a gas or an alloy addition to the metal deposit. Because little or none of the flux becomes slag, it is not necessary to interrupt the deposition process in order to remove slag after each layer of material is deposited. For embodiments where some slag is produced, the amount of slag may be sufficiently low and its thickness may be sufficiently thin such that it need not be removed, simply being remelted upon the deposition of the next layer of material. In such embodiments, a cumulative amount of flux may need to be removed only after a plurality of layers of material are deposited, such as every other layer, or every third or fifth layer, for examples.

Inert gases that are heavier than air are advantageous for shielding, since they displace air near the working surface and in the processing chamber. Table A below lists densities of various gases at standard temperature and pressure that are generated by heating certain flux materials compared to the densities of air and argon.

TABLE A

| GAS | Density kg/m$^3$ |
|---|---|
| Air (ref) | 1.293 |
| Ar (ref) | 1.784 |
| $H_2$ | 0.090 |
| $N_2$ | 1.251 |
| CO | 1.250 |
| $CO_2$ | 1.977 |
| $F_2$ | 1.696 |
| $Cl_2$ | 3.2 |

Figure 1:
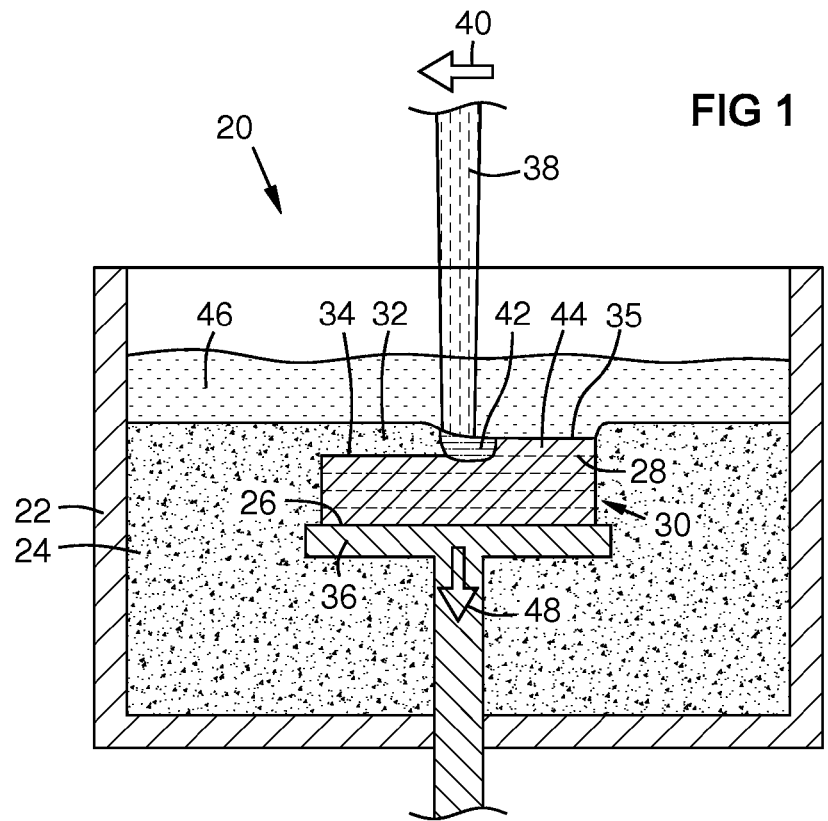
FIG. 1 is a schematic sectional view of apparatus in process of laser additive manufacturing illustrating aspects of an embodiment and use of the invention.

FIG. 1 shows an apparatus 20 for laser additive manufacturing illustrating aspects of an embodiment and use of the invention. A chamber 22 contains a powder 24 that combines filler metal and flux. A movable working surface 26 supports an accumulation of metal layers 28 that form a component 30. A layer 32 of the filler metal and flux powder is spread on the working surface 26 of the build platform 36 then on successive working surfaces 34, 35 on successive layers. A laser beam 38 is traversed 40 across the filler metal and flux powder, creating a melt pool 42 that solidifies 44 to create a further metal layer. In accordance with the invention, the flux generates one or more protective gasses 46 that form a blanket over the melt pool and the solidifying metal layer deposit 44. Then another layer of mixed filler metal and flux powder (or a distinct layer of filler metal powder and another distinct layer of flux powder) is spread on the new working surface 34. The build platform 36 may be lowered 48 below the powder level in the chamber after each layer is added, so the powder can be easily spread on the new working surface 34 for repetition of the process.

The fluxes described herein are slag-free, or nearly slag free, producing not over 5 wt % slag relative to the weight of the flux, and providing a protective gas shield. The flux may be combined with the filler material for superalloy processing, either by mixing of flux and filler material particles, or by particle coating, or by compounding, and can be produced as a powder, paste, putty or other useful form. The filler material may constitute a superalloy powder, or a mixture of superalloy constituent powders, such as for example a nickel based superalloy including at least 40 wt % Ni or other metallic or ceramic materials as may be used to coat a superalloy (e.g. a bond coating or thermal barrier coating). The flux may contribute elemental constituents to the superalloy filler material as later described, thus completing the superalloy or oversupplying one or more elements to restore elemental proportions in an operationally degraded surface.

Figure 2:
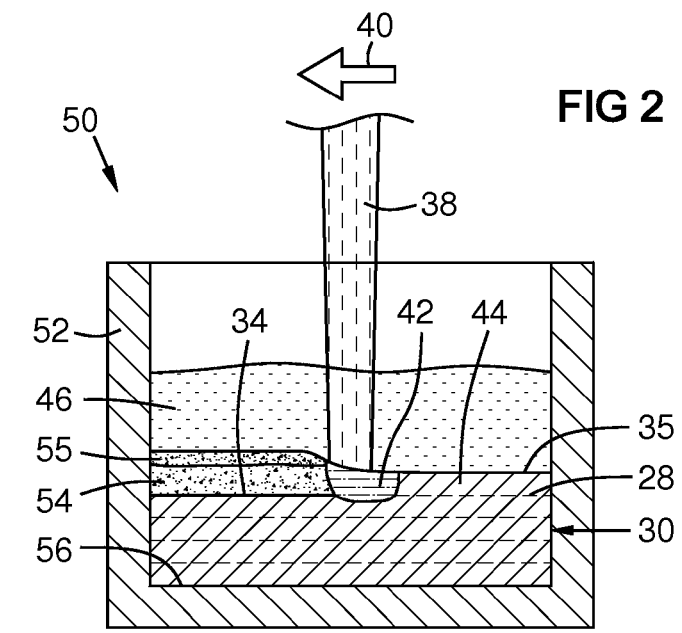
FIG. 2 is a schematic sectional view of alternate apparatus in process of laser additive manufacturing illustrating aspects of an embodiment and use of the invention.

FIG. 2 shows another apparatus 50 for laser additive manufacturing, illustrating aspects of an embodiment and use of the invention. A metal filler powder 54 is spread on a working surface which is initially a surface 56 on a build platform or chamber 52, and then on successive working surfaces 34, 35 on successive layers 28. A flux 55 is spread on the filler powder 54. A laser beam 38 is traversed 40 across the flux and filler powder, creating a melt pool 42 that solidifies 44 to create a further metal layer. The flux and filler materials mix in the melt pool. In accordance with the invention, the flux generates one or more protective gasses 46 that form a blanket over the melt pool and the solidifying metal layer deposit 44. Alternately, not shown, the initial working surface may be a surface of an existing component being repaired or restored.

In either FIG. 1 or FIG. 2, the filler powder and/or the flux may be graded across the geometry of the component slice and/or changed layer by layer during the building process to provide a gradient of constituents, for example providing a hard and/or corrosion resistant outer surface on a stronger inner substrate of a component.

Select metal oxides can be used as flux for processing superalloys, including $Al_2O_3$, $SiO_2$, $TiO_2$, MnO, MgO, and $Cr_2O_3$. When these metal oxides are exposed to the high power density of a laser beam and/or are heated to a liquid temperature of the superalloy, such as 1200-1500° C. (2200-2700° F.), they decompose into oxygen and metal elements. Refractory metal oxides in the flux may be decomposed in a plasma formed by the laser beam at a much higher temperature than the superalloy melting point, for example as in the following decomposition reaction:

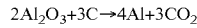
$2Al_2O_3+3C\rightarrow 4Al+3CO_2$

Such decomposition may be catalyzed by elements in the melt pool. If the metal is a constituent of the alloy being processed, it contributes to the metal deposit rather than slag. If carbon is added to the flux, the released oxygen combines with the carbon to generate $CO_2$ and/or CO, which are protective. $CO_2$ is advantageous because it is denser than air. It is denser than, and therefore superior to, argon in this respect. In one embodiment, carbon may be included in the flux in stoichiometric proportion to the oxygen in the metal oxide to create $CO_2$ and therefore without excessive addition of carbon to the metal deposit. For example three moles of carbon (about 36 g) may be provided for every two moles of $Al_2O_3$ (about 204 g), thus ideally producing only aluminum and $CO_2$ at the melt pool temperature. This provides a ratio of one mole of carbon for every two moles of free oxygen after decomposition of $Al_2O_3$ at the liquid temperature of the superalloy. Fluxes that provide gaseous protection plus an elemental addition to the deposit thus provide dual functions of protection and alloy enhancement. Alloy enhancement is useful for example when a gas turbine component surface is operationally depleted of aluminum or another constituent.

Alternately, the filler metal may have intentional proportion deficiencies to be completed by the flux.

Another group of gas-producing flux constituents are carbonates, including $H_2CO_3$, $LiCO_3$, $Na_2CO_3$, $NaHCO_3$, $Na_3H(CO_3)_2$, $K_2CO_3$, $KHCO_3$, $Rb_2CO_3$, $Cs_2CO_3$, $CsHCO_3$, $BeCO_3$, $MgCO_3$, $Mg(HCO_3)_2$, $CaCO_3$, $Ca(HCO_3)_2$, $SrCO_3$, $BaCO_3$, $La_2(CO_3)_3$, $UO_2CO_3$, $MnCO_3$, $FeCO_3$, $CoCO_3$, $NiCO_3$, $CuCO_3$, $Ag_2CO_3$, $ZnCO_3$, $CdCO_3$, $Al_2(CO_3)_3$, $Tl_2CO_3$, $PbCO_3$, $(NH_4)_2CO_3$, $NH_4HCO_3$, and $(BiO)_2CO_3$. Shielding provided by these carbonates is derived from the generation of CO, $CO_2$, and, and in some cases, $H_2$ and $N_2$. Some of these carbonates initially decompose into a metal oxide plus $CO_2$. Then the metal oxide further decomposes to metal and oxygen as described above. Carbon can be added to the flux as described above to enhance $CO_2$ production. If the carbonate includes a constituent of the deposit alloy, it can contribute to the deposit so that no slag is produced. For example, $Al_2(CO_3)_3$, $MnCO_3$, $MgCO_3$, $Mg(HCO_3)_2$, may be used for this. Alternately, if the carbonate fully decomposes into gases at the temperature of the laser induced plasma and/or melt pool, no slag is produced. Fe, Cu, Zn, and Pb can degrade the properties of nickel-based superalloys, so these elements can be excluded from the flux used for such alloys, although they may be permitted in fluxes for other materials. In one embodiment the flux may contain less than 0.35 wt % of a total of Fe, Cu, Zn, and Pb. In another embodiment the total metal addition may contain less wt. % than 0.25 Fe, 0.10 Cu, 0.0005 Pb, and 0.001 Zn, and may be further limited to wt. % maximums of 0.015 P and 0.010 S.

Flux constituents that generate a halide gas are beneficial in some embodiments. Chlorine and fluorine gases are heavier than air as shown in Table A. Metal halides such as $AlF_3$, $MnF_2$, $CoF_2$, $NiF_2$, $TiCl_4$, $CrCl_6$, $MnCl_4$, $CoCl_4$, and $NiCl_4$ thermally decompose to generate a heavier-than-air blanket for shielding while simultaneously providing a metal alloying function in a slag-free fashion.

Nonmetallic halides may provide beneficial flux constituents in some embodiments. For example, $NH_4Cl_3$ reacts with metal oxides on the working surface, thereby cleaning the surface and forming volatile metal chlorides without slag.

Flux constituents that generate hydrogen and fluorine, are beneficial in some embodiments, because these gases interact with sulfur and phosphorous in the melt pool to generate new gases that can escape the deposit. This cleans the deposit of sulfur and phosphorous. Examples of such cleansing gases include $H_2S$, $CH_3SH$, $PH_3$ and $PF_3$. The H, C and F of these gases are introduced by flux constituent decompositions, such as $HN_4Cl_3$ and $H_2CO_3$ that contribute H, carbonates that contribute C, and metal halides that can contribute F. The tramp sulphur and phosphorous in the melt react with the H, C and/or F to produce the cleansing gases which then escape the deposit.

Flux embodiments may be formulated for a combination of benefits, for example a flux embodiment may comprise:

10-60 wt % carbonate selected from one or more of $H_2CO_3$, $LiCO_3$, $Na_2CO_3$, $NaHCO_3$, $Na_3H(CO_3)_2$, $K_2CO_3$, $KHCO_3$, $Rb_2CO_3$, $Cs_2CO_3$, $CsHCO_3$, $BeCO_3$, $MgCO_3$, $Mg(HCO_3)_2$, $CaCO_3$, $Ca(HCO_3)_2$, $SrCO_3$, $BaCO_3$, $La_2(CO_3)_3$, $UO_2CO_3$, $MnCO_3$, $FeCO_3$, $CoCO_3$, $NiCO_3$, $CuCO_3$, $Ag_2CO_3$, $ZnCO_3$, $CdCO_3$, $Al_2(CO_3)_3$, $Tl_2CO_3$, $PbCO_3$, $(NH_4)_2CO_3$, $NH_4HCO_3$, and $(BiO)_2CO_3$ used primarily for shielding and metallic alloying, 10-60 wt % metallic halide selected from one or more of $AlF_3$, $MnF_2$, $CoF_2$, $NiF_2$, $TiCl_4$, $CrCl_6$, $MnCl_4$, $CoCl_4$, and $NiCl_4$ used primarily for scavenging and vaporizing impurities from the deposit and metallic alloying, 10-30 wt % nonmetallic halide $NH_4Cl_3$ for scavenging and vaporizing impurities from the deposit; and one mole of carbon for each two moles of free oxygen released by thermal decomposition of any other flux constituents in the plasma and/or at the temperature of the melt pool, if any.

Embodiments of slag free processing in accordance with aspects of the invention may be applied to superalloys having nickel, cobalt or another element as the largest constituent. Embodiments may also be applied to a bond coat of a thermal barrier coating system of the form MCrAlY, where M represents Co or Ni. Furthermore, it may be extended beyond additive manufacturing and beyond processing of metal alloys. For example, coating of parts with ceramics may be achieved with fluxes tailored to provide the appropriate atmosphere for a specific coating yet leaving no or little slag residue on the surface. Thermal barrier coatings such as zirconia and hafnia have been sintered in the presence of small quantities of traditional fluxing agents such as silica, alumina, iron oxide, calcium oxide, and magnesium oxide. However, such flux agents produce slag residue. Slag free fluxes for such processing may be provided by zirconium halides such as $ZrF_4$, $ZrCl_4$, $ZrBr_4$, $ZrI_4$, or by zirconium or yttrium carbonates $Zr(OH)_2CO_3$, $ZrO_2$, and $Y_2(CO_3)_3.H_2O$. Such fluxes may include at least 60 wt. % of one or more constituents selected from the group consisting of $ZrF_4$, $ZrCl_4$, $ZrBr_4$, $ZrI_4$, $Zr(OH)_2CO_3$, $ZrO_2$, and $Y_2(CO_3)_3.H_2O$.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. flux for use during laser deposition of material, the flux comprising at least one constituent which, when heated during a laser deposition process, produces at least one gas that is heavier than air, and wherein not more than 5 wt % of the flux becomes slag upon cooling after the laser deposition process.

2. The flux of claim 1, wherein the flux contains less than 0.35wt % of a total of Fe, Cu, Zn, and Pb.

3. The flux of claim 1, further comprising a constituent addition to a superalloy deposited during the laser deposition process.

4. The flux of claim 3, further comprising the constituent addition for the superalloy provided by a compound in the flux selected from the group of: $Al_2O_3$, $SiO_2$, $TiO_2$, MnO, MgO, $Cr_2O_3$, $Al_2(CO_3)_3$, $MnCO_3$, $MgCO_3$, $Mg(HCO_3)_2$.

5. The flux of claim 1, further comprising:
a compound that decomposes in a laser induced plasma or at a liquid temperature of the material being deposited and produces free oxygen; and
an amount of carbon available to combine with substantially all of the free oxygen during the deposition process to produce $CO_2$.

6. The flux of claim 1, further comprising a halide selected from the group consisting of $AlF_3$, $MnF_2$, $CoF_2$, $NiF_2$, $TiCl_4$, $CrCl_6$, $MnCl_4$, $CoCl_4$, $NiCl_4$, and $NH_4CL_3$.

7. The flux of claim 1, further comprising:
10-60 wt % selected from one or more carbonates;
10-60 wt % selected from one or more metal halides; and
10-30 wt % $NH_4Cl_3$.

8. The flux of claim 1, further comprising:
10-30 wt % $NH_4Cl_3$; and
10-80 wt % selected from one or more compounds selected from carbonates, metal oxides, and metal halides.

9. The flux of claim 1, further comprising:
10-60 wt % carbonate selected from one or more of $H_2CO_3$, $LiCO_3$, $Na_2CO_3$, $NaHCO_3$, $Na_3H(CO_3)_2$, $K_2CO_3$, $KHCO_3$, $Rb_2CO_3$, $Cs_2CO_3$, $CsHCO_3$, $BeCO_3$, $MgCO_3$, $Mg(HCO_3)_2$, Ca—$CO_3$, $Ca(HCO_3)_2$, $SrCO_3$, $BaCO_3$, $La_2(CO_3)_3$, $UO_2CO_3$, $MnCO_3$, $FeCO_3$, $CoCO_3$, $NiCO_3$, $CuCO_3$, $Ag_2CO_3$, $ZnCO_3$, $CdCO_3$, $Al_2(CO_3)_3$, $Tl_2CO_3$, $PbCO_3$, $(NH_4)_2CO_3$, $NH_4HCO_3$, and $(BiO)_2CO_3$ used primarily for shielding and metallic alloying,
10-60 wt % metallic halide selected from one or more of $AlF_3$, $MnF_2$, $CoF_2$, $NiF_2$, $TiCl_4$, $CrCl_6$, $MnCl_4$, $CoCl_4$, and $NiCl_4$,
10-30 wt % $NH_4Cl_3$ ; and
one mole of carbon for each two moles of free oxygen released by thermal decomposition of any other constituents of the flux.

10. The flux of claim 1, formulated for use during the deposition of a ceramic thermal barrier material, the flux comprising least 60 wt. % selected from the group consisting of $ZrF_4$, $ZrCl_4$, $ZrBr_4$, $ZrI_4$, $Zr(OH)_2CO_3$, $ZrO_2$, and $Y_2(CO_3)_3.H_2O$.

11. A combined filler and flux material for laser processing of a superalloy weld or fabrication deposit, the combined filler and flux material comprising:
a superalloy filler material; and
a flux material comprising one or more constituents which, when heated during the laser processing, produce one or more gasses effective to form a blanket of said one or more gasses on the deposit, wherein not more than 5 wt. % of said flux material becomes a slag on the deposit upon cooling.

12. The combined filler and flux material of claim 11, wherein a total metal addition therein contains less than 0.35 wt % of a total of Fe, Cu, Zn, and Pb.

13. The combined filler and flux material of claim 12, wherein the total metal addition therein contains respective wt. % maximums of 0.015 P and 0.010 S.

14. The combined filler and flux material of claim 11, wherein a first one of the one or more constituents of the flux material is a metal oxide, and a second one of the one or more constituents of the flux material is carbon in an amount that combines with substantially all free oxygen in a decomposition product of the flux material when heated during the laser processing to produce $CO_2$.

15. The combined filler and flux material of claim 14, wherein the metal oxide is selected from the set of $Al_2O_3$, $SiO_2$, $TiO_2$, MnO, MgO, and $Cr_2O_3$.

16. The combined filler and flux material of claim 11, wherein at least one of the one or more constituents of the flux material is a carbonate, and the flux contains less than 0.35 wt % of a total of Fe, Cu, Zn, and Pb.

17. The combined filler and flux material of claim 11, wherein at least one of the one or more constituents of the flux material is a metal halide comprising chlorine or fluorine.

18. The combined filler and flux material of claim 11, wherein at least one of the one or more constituents of the flux material is selected from the set consisting of $AlF_3$, $MnF_2$, $CoF_2$, $NiF_2$, $TiCl_4$, $CrCl_6$, $MnCl_4$, $CoCl_4$, $NiCl_4$, and $NH_4CL_3$.

19. A flux for laser processing of a ceramic thermal barrier coating, the flux comprising at least one constituent which, when heated, produces at least one gas that is heavier than air, and wherein not more than 5 wt % of the flux becomes slag upon cooling.

20. The flux of claim 19 comprising at least 60 wt. % selected from the set of $ZrF_4$, $ZrCl_4$, $ZrBr_4$, $ZrI_4$, $Zr(OH)_2CO_3$, $ZrO_2$, and $Y_2(CO_3)_3 \cdot H_2O$.

* * * * *

UNITED STATES PATENT AND TRADEMARK OFFICE
CERTIFICATE OF CORRECTION

PATENT NO. : 9,782,859 B2
APPLICATION NO. : 14/800784
DATED : October 10, 2017
INVENTOR(S) : Gerald J. Bruck and Ahmed Kamel It is certified that error appears in the above-identified patent and that said Letters Patent is hereby corrected as shown below:

In the Specification

The chemical formula "$CoCl_4$" should read "$CoCl_2$" in Column 4 Line 34.
The chemical formula "$NiCl_4$" should read "$NiCl_2$" in Column 4 Line 35.
The chemical formula "$NH_4Cl_3$" should read "$NH_4Cl$" in Column 4 Line 39.
The chemical formula "$CoCl_4$" should read "$CoCl_2$" in Column 4 Line 65.
The chemical formula "$NiCl_4$" should read "$NiCl_2$" in Column 4 Line 66.
The chemical formula "$NH_4Cl_3$" should read "$NH_4Cl$" in Column 5 Line 1.

In the Claims

The chemical formula "$CoCl_4$" should read "$CoCl_2$" in Column 5 Line 63 Claim 6.
The chemical formula "$NiCl_4$" should read "$NiCl_2$" in Column 5 Line 63 Claim 6.
The chemical formula "$NH_4CL_3$" should read "$NH_4Cl$" in Column 5 Line 63 Claim 6.
The chemical formula "$NH_4Cl_3$" should read "$NH_4Cl$" in Column 5 Line 67 Claim 7.
The chemical formula "$NH_4Cl_3$" should read "$NH_4Cl$" in Column 6 Line 2 Claim 8.
The chemical formula "$CoCl_4$" should read "$CoCl_2$" in Column 6 Line 17 Claim 9.
The chemical formula "$NiCl_4$" should read "$NiCl_2$" in Column 6 Line 18 Claim 9.
The chemical formula "$NH_4Cl_3$" should read "$NH_4Cl$" in Column 6 Line 19 Claim 9.
The chemical formula "$CoCl_4$" should read "$CoCl_2$" in Column 6 Line 66 Claim 18.
The chemical formula "$NiCl_4$" should read "$NiCl_2$" in Column 6 Line 66 Claim 18.
The chemical formula "$NH_4CL_3$" should read "$NH_4Cl$" in Column 6 Line 67 Claim 18.

Signed and Sealed this
Twenty-fifth Day of August, 2020

Andrei Iancu
*Director of the United States Patent and Trademark Office*